United States Patent [19]

Gram

[11] Patent Number: 4,751,806
[45] Date of Patent: Jun. 21, 1988

[54] PRODUCTION APPARATUS COMPRISING A STEP-WISE DRIVEN CONVEYOR DEVICE

[75] Inventor: Klaus Gram, Vojens, Denmark

[73] Assignee: Br drene Gram A/S, Vojens, Denmark

[21] Appl. No.: 938,980

[22] Filed: Dec. 8, 1986

[30] Foreign Application Priority Data

Dec. 13, 1985 [DK] Denmark .................. 5809/85

[51] Int. Cl.⁴ .................. B65B 3/04; B65B 5/10; B65B 39/14; B65B 7/28

[52] U.S. Cl. ........................... 53/282; 53/237; 53/239; 53/240; 426/130; 426/139; 426/282

[58] Field of Search .............. 53/237, 238, 239, 240, 53/282; 426/130, 139, 274, 282, 393

[56] References Cited

U.S. PATENT DOCUMENTS

| | | | |
|---|---|---|---|
| 2,925,347 | 2/1960 | Cummings et al. | 426/393 X |
| 2,984,059 | 5/1961 | Hollingsworth | 53/239 X |
| 3,070,933 | 1/1963 | Carter et al. | 53/282 |
| 3,171,367 | 3/1965 | Carter et al. | 426/282 |
| 3,572,007 | 3/1971 | Shelby et al. | 53/282 |
| 3,965,656 | 6/1976 | Gerben | 53/282 |
| 4,024,694 | 5/1977 | Cooper et al. | 53/282 |
| 4,159,608 | 7/1979 | Masuda et al. | 53/282 |
| 4,188,768 | 2/1980 | Getman | 426/282 X |
| 4,600,591 | 7/1986 | Galli | 426/282 X |
| 4,666,723 | 5/1987 | Invernizzi et al. | 426/130 X |

Primary Examiner—Horace M. Culver
Attorney, Agent, or Firm—Watson, Cole, Grindle & Watson

[57] ABSTRACT

A production apparatus comprises a step-wise driven conveyor adapted to receive articles to be subjected to different operations. Along the conveyor operative devices are arranged for carrying out the different operations to which the articles are to be subjected. The operative devices having comparatively short operation periods are stationarily arranged along the conveyor, whereas at least two operative devices having comparatively long operation periods, are movably arranged along the conveyor so as to follow the conveyor while the conveyor makes at least one step and then to be moved one such step opposite to the direction of movement of the conveyor. By such doubling of the operative device or devices having long operation periods, an increased capacity of the production apparatus is achieved. The production apparatus can be used in producing ice cream coronets.

8 Claims, 7 Drawing Sheets

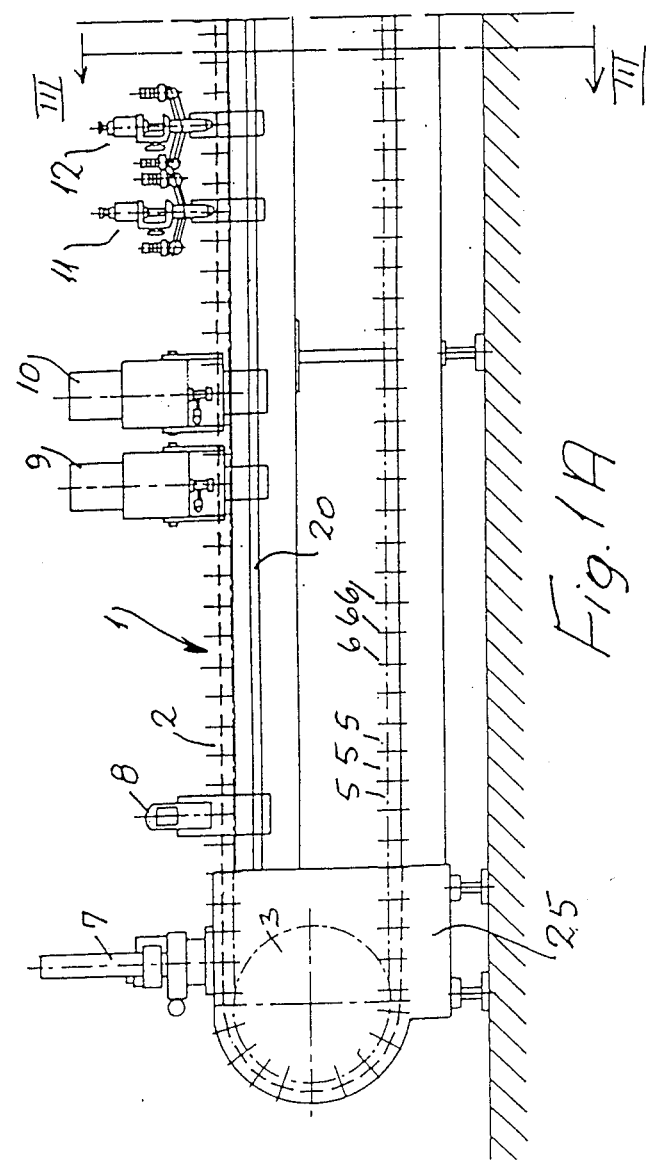

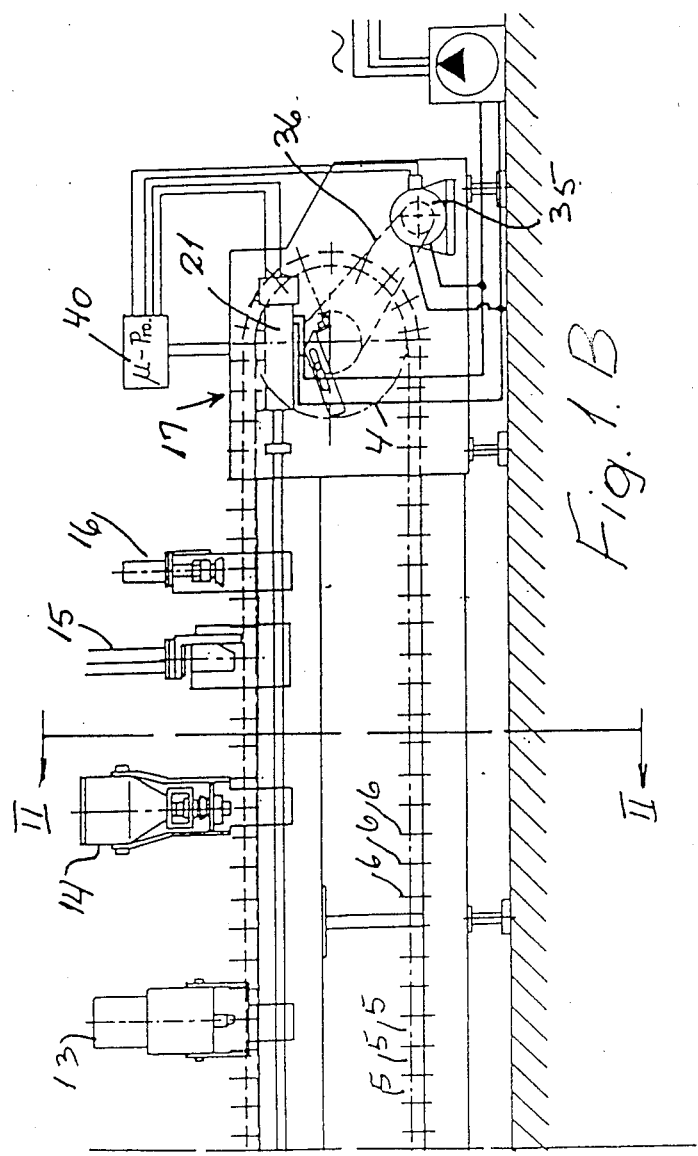

Fig. 8

PRODUCTION APPARATUS COMPRISING A STEP-WISE DRIVEN CONVEYOR DEVICE

BACKGROUND OF THE INVENTION

The present invention relates to a production apparatus comprising a step-wise driven conveyor device having means for arranging objects to be subjected to different operations, the production apparatus also comprising operative devices for carrying out the operations to which the articles are to be subjected, e.g., an apparatus for the production of ice cream confection, such as ice cream cornets.

Production apparatuses of the kind referred to above are known. According to the prior art, the different operative devices carry out their operations while the conveyor device stands still. Accordingly, the stop periods of the conveyor device are dictated by the operative device which has the longest operation time. The result may be that the passing time for the articles in question through the production apparatus is unnecessarily extended, because the operative devices having only short operation periods, are inactive during a part of the stationary periods of the conveyor device.

SUMMARY OF THE INVENTION

It is an object of the present invention to provide a production apparatus of the kind referred to above, which, even though one or more of the operative devices requires a comparatively long period for carrying out its or their operations, nevertheless is able to operate with comparatively short stationary periods in order to increase the productivity, and this object is, according to the present invention, achieved in that those of the operative devices, having the shorter operation times, are stationarily arranged along the conveyor device, and in that at least two operative devices having longer operation times are movably mounted along the conveyor device so as to move together with the conveyor device while the conveyor device makes at least one step and then to be removed one such step opposite to the direction of movement of the conveyor device. Thereby it is achieved that those of the operative devices having the longer operation periods may inititate their operations while the conveyor device stands still, viz, in the period between two steps, and may continue their operations during the next step of the conveyor device, and then they may continue their operations during the following stop period. This, however, requires that the operative devices having comparatively long operation periods must be doubled, but on the other hand the capacities of the stationary operative devices are better utilized in such a way that the total production may be increased.

According to a preferred embodiment of the present invention the at least two operative devices may be arranged with a mutual distance corresponding to the length of one step or an unequal number of steps of the conveyor device. Thereby it is achieved that the at least two operative devices will treat all the articles carried by the conveyor device. Furthermore, it is achieved that the at least two operative devices need not be arranged with a mutual distance corresponding to one step of the conveyor device, which sometimes may be difficult to achieve because such operative devices may occupy so much room that it is impossible to arrange them with a mutual distance corresponding to only one step of the conveyor device.

According to a particularly simple embodiment of the production apparatus according to the invention, the conveyor device may consist of a rectilinear conveyor.

A further embodiment of the production apparatus according to the invention is characterized in that the driving device for the conveyor comprises a moment amplifier, and in that the driving device for the movable operative devices comprises a linear amplifier, the amplifiers being synchronized so as to move the conveyor and the movable operative devices in synchronism during the forward steps of the operative devices and the conveyor, the amplifiers, moreover, being adjustable for adjusting the speed and the length of step of the stepwise movement. Thereby it is possible to adapt the speed profiles of the movable operative devices and of the conveyor in such a way that the production apparatus may work at its optimum, depending upon the operations to be applied to the articles in question.

Moreover, it is appropriate if the stop periods of the amplifiers also are adjustable, because it will then be possible to adapt the production apparatus to that of the stationary operative devices having the longest operation time.

In order to achieve the synchronism required by the amplifiers, each of these may, according to the invention, be adapted to be controlled by a corresponding step-motor, and such step-motors may be controllable by means of a micro processor, which is common to the step-motors.

In order to obtain an easy replacement of the individual operative devices of the production apparatus according to the specific operations which are to be carried out by the operative devices, the conveyor may, according to an embodiment of the present invention along one side thereof be provided with a longitudinally-extending beam and a longitudinally-extending, reciprocatably movable sliding rod, and along the other side thereof be provided with a longitudinally-extending stationary sliding rod, the stationary operative devices being adapted to be secured to the beam and the stationary sliding rod, whereas the movable operative devices being arranged to be secured to the movable sliding rod and to be movably supported with respect to the stationary sliding rod.

BRIEF DESCRIPTION OF THE DRAWINGS

FIGS. 1A amd 1B positioned in continuation of each other illustrate an embodiment of the production apparatus according to the present invention in front view, FIG. 8 shows a flow sheet for illustrating the operation of the production apparatus.

DESCRIPTION OF THE PREFERRED EMBODIMENT

Figure 2:
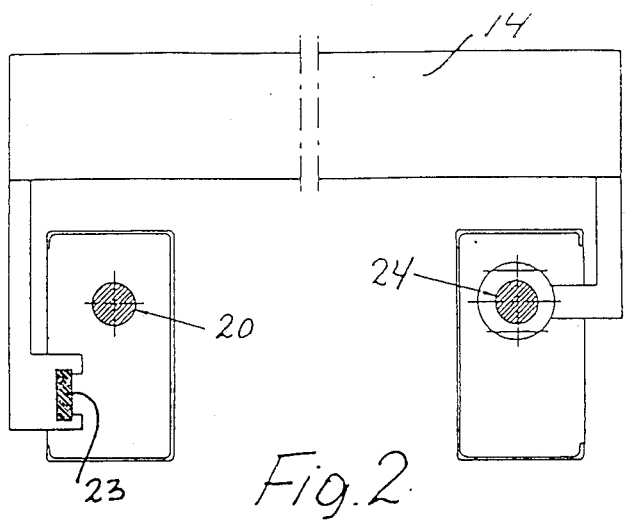
FIG. 2 shows schematically a section according to section line II—II in FIG. 1B.

The production apparatus illustrated in FIGS. 1A and 1B comprises a step-wise driven conveyor device 1 which, according to the embodiment illustrated, consists of a rectilinearly moved conveyor. The conveyor consists of an endless conveyor band 2 which is trained around end reversing rollers 3 and 4. According to the embodiment shown, the band consists of lamellae 5 hinged at their ends to two endless chains (not shown). The lamellae 5 are not shown in detail on the drawing, but consist of narrow and transversally with extending (with respect to the conveyor band in question) extending metal strips arranged side by side with small gaps. The gaps between the lamellae and accordingly the pitch of the band is on the drawing marked by means of short lines 6,6 . . . 6 extending perpendicular to the band.

The embodiment illustrated on the drawing of the production apparatus is intended for the manufacturing of ice cream confections in the form of ice cornets with conical wafers. Accordingly, each transversally extending lamellae comprises a row of means, in the embodimnt illustrated holes, for arranging the articles to be subjected to the different operations. In order to carry out these operations the production apparatus illustrated comprises a row of operative devices which as seen from the left hand side in FIGS. 1A and 1B consist of the following devices: a stationary operative device 7 for inserting a row of wrapping cones wherein conical wafers are arranged in the holes of each metal strip, an operative device 8 for controlling that each hole has been provided with such cone, two equal operative devices 9,10 for impregnating the wafers arranged in the wrapping cones, then two operative devices 11,12 for filling ice cream into the wafers concerned follow, which also are equal, an operative device 13 for arranging chocolate upon the ice cream deposited, an operative device 14 for sprinkling a decorative material, an operative device 15 to provide the cones with a lid, and an operative device 16 for closing the cones around the lids arranged, and finally an ejector station 17 which will be explained in further detail below.

It will be understood that the operative devices referred to above are mentioned as examples only.

Of the operative devices referred to, the devices 7, 8, 13, 14, 15 and 16 are stationary according to the embodiment illustrated, whereas the two impregnating devices 9,10 and the two filling devices 11,12 are movable.

Along the side of the production apparatus, which in FIGS. 1A and 1B faces the viewer, a reciprocatably movable sliding rod 20 is provided along the apparatus and is driven by means of an actuator or driving device 21 in the form of a linear amplifier, FIG. 1B. Along this side of the production apparatus, moreover, as it appears from FIGS. 2 and 3, a stationary beam 23 is arranged. Along the opposite side of the production apparatus a longitudinally extending, stationary sliding rod 24, cf. also FIGS. 2 and 3, is arranged.

The operative device 7 is, according to the embodiment shown, supported by means of the frame 25 of the conveyor, whereas the stationary devices 8, 13, 14, 15 and 16 at one side thereof are clamped to the beam 23, cf. FIG. 2, which schematically illustrates one such stationary operative device, viz. the device 14. The stationary operative devices are at the other side thereof clamped to the stationary sliding rod 24.

Figure 3:
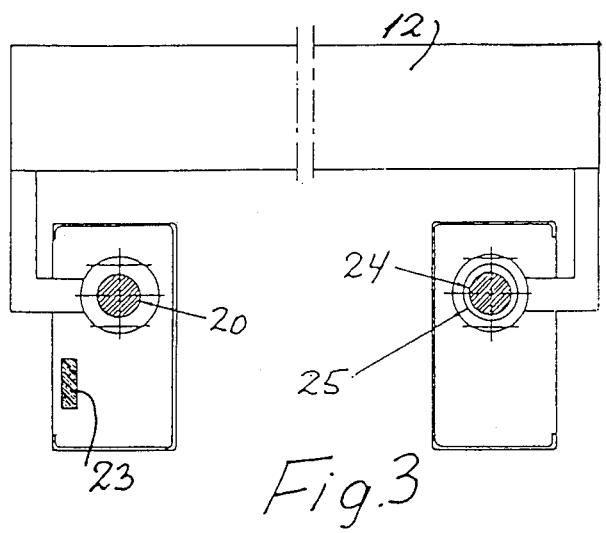
FIG. 3 shows schematically a section according to line III—III in FIG. 1A.

As regards the movable operative devices, of which one, viz. 12, schematically is shown in FIG. 3, these movable devices are at one side thereof clamped to the movable sliding rod 20, whereas at their other side they are supported by means of th stationary sliding rod 24. upon which they, however, are movably supported by means of a ball sleeve, respectively, as indicated at 25 in FIG. 3.

Accordingly, it will be understood that when the sliding rod 20 is reciprocated in the longitudinal direction, the sliding rod 20 will carry with it the devices 9,10,11 and 12, which during such movement will slide upon the stationary sliding rod 25. On the contrary, the stationary devices will be secured in their positions due to the securing as explained above to the beam 23 and the atationary sliding rod 24, respectively.

Figure 5:
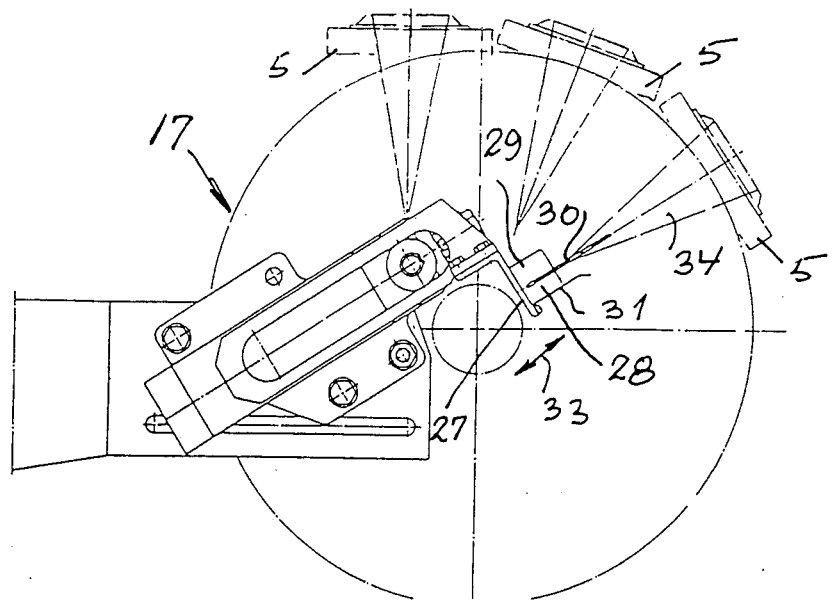
FIG. 5 shows a front view of an ejector station for the apparatus illustrated in FIGS. 1A and 1B.
Figure 6:
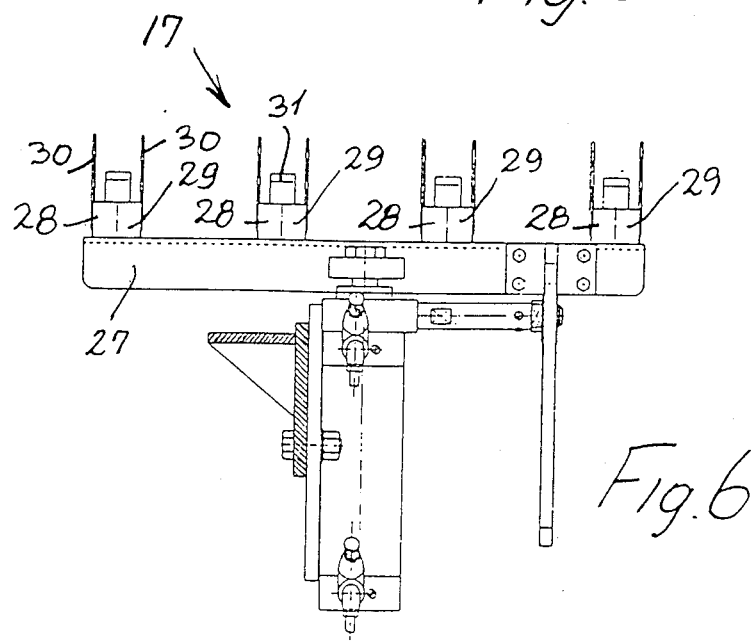
FIG. 6 shows the ejector apparatus illustrated in FIG. 5 generally as seen from the left in FIG. 5.

The ejector station 17, which is shown more detailed in FIGS. 5 and 6, is of a kind known per se, and accordingly it should only be mentioned that it consists of a transversally-extending beam 27 which is reciprocably in its longitudinal direction. The cross beam 27 carries a number of ejectors 28 corresponding to the number of arranging means in each lamellae. Each of the ejectors consists of a block 29 to two opposite sides of which guiding pins 30,30 are secured, and furthermore each block is provided with an abutment 31. The beam 27 is movable as indicated by means of the double arrow 33 in FIG. 3, and when a row of articles, which has been finally treated, are positioned aligned wtih the guiding pins 30, the ejector device is activated, whereby the row of cornets 34 in question is ejected from the corresponding conveyor band lamella 5.

The conveyor of the production apparatus is driven by means of an actuator 35, FIG. 1B, in the form of a moment amplifier which via a gear, schematically shown in the form of a chain gearing 36, drives the end reversing roller 4 which drives the conveyor band.

Figure 7:
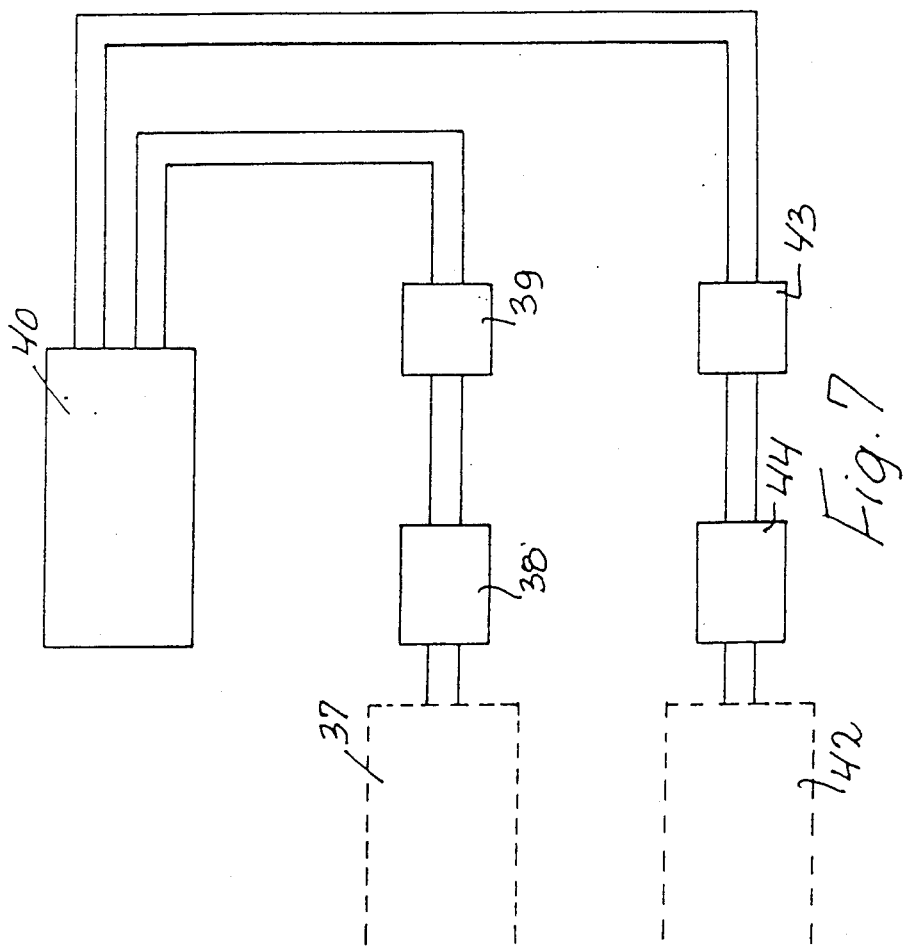
FIG. 7 shows schematically a circuit for actuators used for driving the apparatus illustrated in FIGS. 1A and 1B.

According to the embodiment illustrated a linear amplifier known per se is used as the linear amplifier 21, e.g., a linear amplifier from the firm "SIG Schweizerische Industrie-Gesellshaft" and termed "Elektrohydraulische Linearverstärker". Such linear amplifier consists of a hydraulic piston-cylinder device which as shown in FIG. 7 has a built-in hydraulic valve 37 driven by means of a step member 38 via a control chart 39 from a micro processor 40. Due to the fact that such linear amplifier is known per se it should only be mentioned here, that when one wishes to start the linear amplifier, a pulse is issued from the micro precessor 40 to the control chart 39 which controls the step motor, and the output shaft of the step motor will now rotate a predetermined number of degrees either in one or the other direction. The direction, in which the step motor 38 rotates is also controlled by means of the micro processor. As mentioned the step motor 38 is connected with a hydraulic valve 27, and the valve on its idee deives the linear amplifier 21 by feeding hydraulic liquid to one or the other side of the piston of the piston-cylinder device. The piston is provided with threads with which a spindle engages, and the spindle is to one end thereof connected to the hydraulic valve. When the piston moves either in one or the other direction the result will be that the spindle is rotated, whereby the hydraulic valve is controlled oppositely, accordingly, the hydraulic valve will be closed in case it was open, and accordingly the driving of the piston stops. As regards the linear amplifier, a well defined movement of the piston of the amplifier in the longitudinal direction is achieved for each pulse issued by the microprocessor.

Generally, the moment amplifier 35 operates in the same way, seeing that also the amplifier 35 is provided with a hydraulic valve 42 which is controlled from the micro processor 40 via a control chart 43 and a step motor 44. In this instance the hydraulic valve controls feeding of hydraulic liquid to a hydraulic motor, and in the same way as explained above as regards the linear amplifier, the hydraulic motor will b rotated a definate angle of rotation for each pulse which is issued by the micro processor 40. This angle of rotation will via the claim 36 be transferred to the end reversing roller 4, and accordingly drive the conveyor band. Due to the gearing of the chain 36, the angle which the moment amplifier 35 rotates by each pulse received from the micro processor will result in a movement of the conveyor band corresponding to the movement which is applied to the movable sliding rod by the linear amplifier when the latter receives a pulse from the micro processor. such a moment amplifier is commercially available from the firm SIG Schweizerische Industire-Gesellschaft termed "Elektrohydraulische Drehmomentverstärker".

Accordingly, the movable operative devices and the conveyor band will follow each other each time a pulse is issued to the moment ampliifer and the linear amplifier. Accordingly, the number of pulses issued by the micro processor 40 will determine the distance which the band and the movable devices move. Due to the fact that the micro processor simultaneously may reverse the direction of movement of the linear amplifier it is, accordingly, possible to obtain the curves indicated in FIG. 4 as regards the movements ofthe conveyor band and the movable devices respectively as a function of the time. The speed with which the conveyor band and the movable devices are moved during the step-wise movement may also be controlled by means of the micro processor, viz. by changing th frequency of the pulses issued during the step-wise movement in question.

Figure 4:
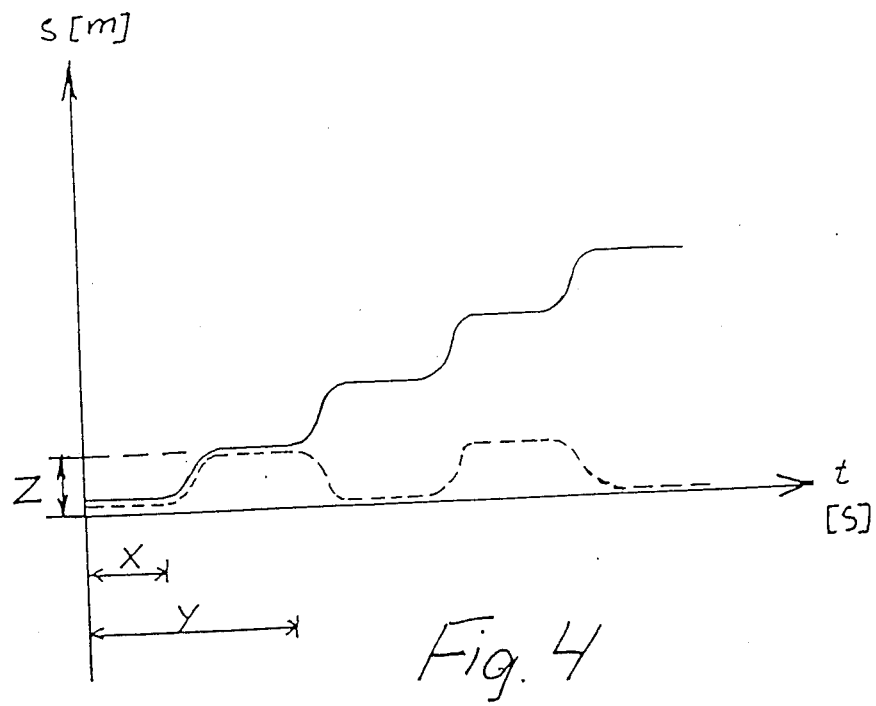
FIG. 4 shows also schematically graphs for illustrating the movements of parts of the production apparatus illustrated in FIGS. 1A and 1B.

The movement of the conveyor band in question as a function of the time is shown in FIG. 4 in full line, whereas the movement of the movable devices is shown in broken line as a function of the time. It will be seen that from the time 0 and until the time period X has lapsed both the movable devices and the band will be stationary. Then the movable devices and the band will move simultaneously with the same speed variation until the movable devices and the band have moved one step (corresponding to the ordinate Z in FIG. 4). Now both the movable devices and the band will be stationary during the next stop period. during the next step movement the band will move one step in the previous direction of movement until it has made a new step corresponding to the ordinate Z. Simultaneously, the movable devices will be moved back to their strating position, i.e., one step in the direction opposite to the direction of movement of the band corresponding to the ordinate 0 in FIG. 4.

Figure 8:
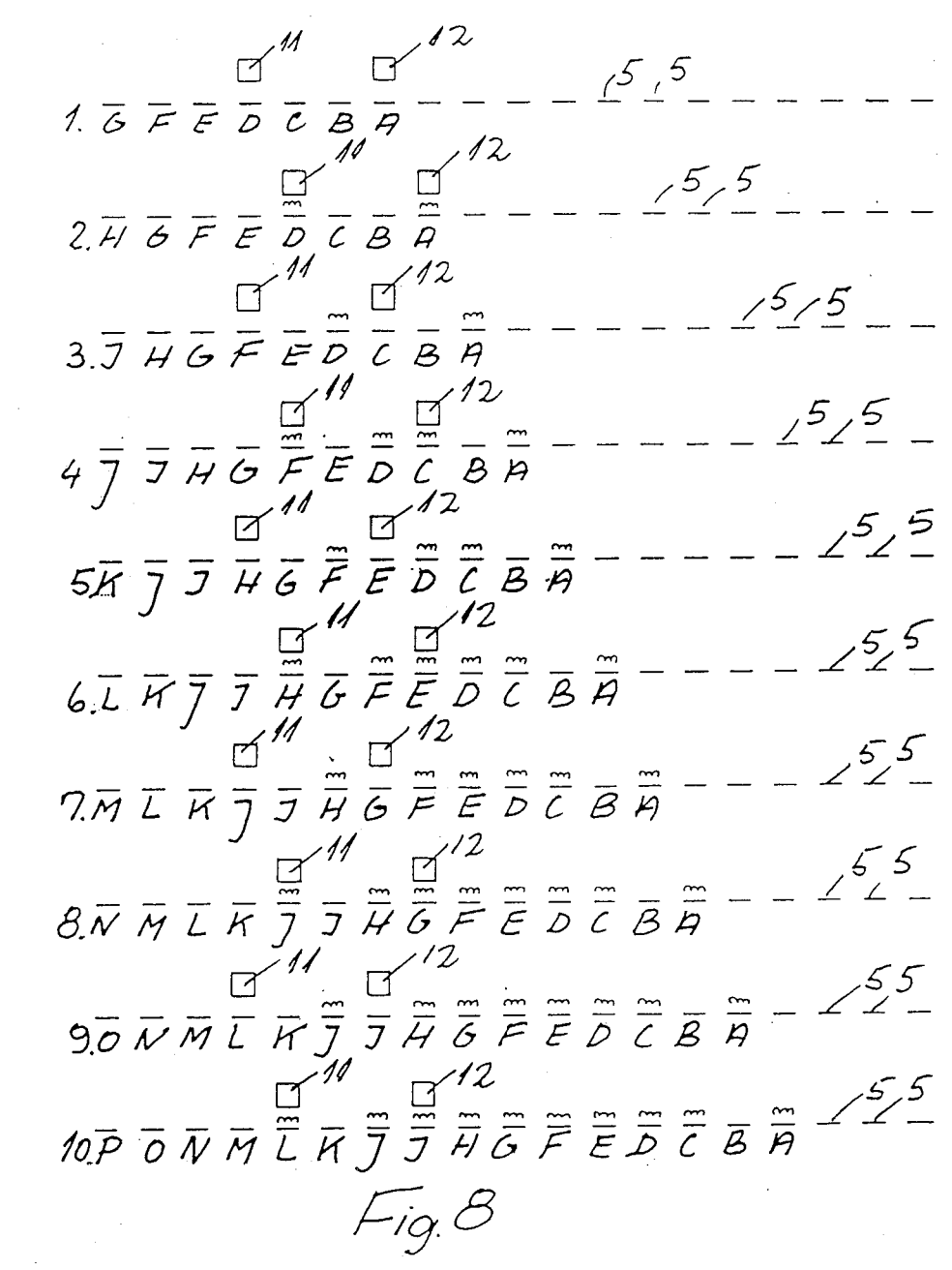

FIG. 8 shows how two of the movable devices, e.g.,- the movable filling devices 11 and 12, operate. At the top of FIG. 8 a condition is shown wherein band lamellae A, B, C . . . F have reached a position such that the foremost of the lamellae is positioned below the filling device 12 shown to the right in FIG. 1A while the filling device 12 is positioned in its left hand position, viz. moved one step to the left by means of the linear amplifier. The dame will apply as regards the filling device 11 and below the filling device 11 the lamellae D will be positioned. If it is assumed that the two filling devices start their operation at this time, they will initiate a filling of the cones positiond below the two filling devices, viz. the cones which are arranged in the band lamellae A and D. After the end of the stop period,the band and the devices 11,12 will move to the position which is shown aligned with "2" in FIG. 8, and during this movement the filling devices 11 and 12 will continue their operation. When the condition "2" has been terminated, the filling of the wafers in the lamellae A and D will also be terminated which on the drawing is indicated in the form of a wave line over the lamellae A and D in question.

Now the devices 11 and 12 are moved one step to the left, and simultaneously the band is moved one step to the right, and accordingly the devices 11 and 12 will now be positioned above the lamellae F and C. Accordingly, a filling of the wafers arranged thereon is now initiated, and such filling will be continued during the movement from the condition "3" to the condition "4", and when this condition ends also the wafers in the lamellae F and C will be filled as indicated.

From the following conditions "5-10" it will be seen that the two devices 11 and 12 supplement each other in such a way that each of the devices fills alternate rows of wafers. However, the wafers positioned in the lamella B in FIG. 8 will not be filled, and when the production is interrupted also an "empty" lamellae will occur.

It will now be understood that the devices 11 and 12 will fill alternate rows of wafers if the devices 11 and 12 are arranged with a mutual distance corresponding to one step. However, in practice it is difficult to arrange two filling devices 11 and 12 that close due to the fact that the devices in question take up more room in the direction of their width than the distance which corresponds to one pitch or step of the band. On the drawing an example has been illustrated wherein the mutual distance between the two filling devices 11 and 12 and the mutual distance between the two impregnating devices 9 and 10 corresponds to three pitches or steps. However, it will be understood that the same effect is achieved if another distance exists betwen such two doubled devices, however under the condition that such distance corresponds to an unequal number of steps.

Instead of the production line shown in FIGS. 1A and 1B the production apparatus in question may be used in connection with other operations, seeing that the operating devices shown may easily be exchanged with other operating devices. For instance reference should be made to the production of ice cream of the kind where ice cream is arranged between two planar wafers. In this case a row of wafers is arranged upon each conveyor band lamellae during the first operation which may be done during one stationary period of the band. Then ice cream is applied to the wafers by means of two filling devices in the way explained above, whereafter the ice cream positioned is provided with decorating material which may be done during one stationary period. By means of a following operating apparatus a cover wafer is now positioned which may also be done during on stationary period. Reference should also be made to a production where it is requested to fill cups with alternating layers of, e.g., jam and ice cream where the positioning of the cups may be made during a single stop period which also applies as regards the positioning of a dose of jam. Then the filling of ice cream is made by means of a doubled filling device in the way previously described, and, if requested, this operation may be followed by the arranging of a layer of whipped cream during one stop period. The applying of a cup lid then follows which may also be carried out during one stop period, and finally the securing of the lid in question is made which also may be done during one stop period.

I claim:

1. An apparatus for producing a multi-component product in a production zone, said apparatus comprising:
   a conveyor device which includes a run on which said multi-component product is formed,
   a first drive means attached to said conveyor device for moving said run thereof through said production zone in a stepwise fashion, thereby causing said run of said conveyor device to be stopped at predetermined stop positions and to be moved forwardly through said production zone between said stop positions,
   a plurality of stationary discharge devices postioned in spaced apart fashion in said production zone and along said run of said conveyor device, each of said stationary discharge devices being capable of depositing a component of said multi-component product on said run of said conveyor device when said run of said conveyor device is at a corresponding stop position within said production zone,
   a plurality of movable discharge devices positioned in spaced apart fashion in said production zone and along said run of said conveyor device, each of said movable discharge devices being capable of (a) depositing a first portion of its associated component of said multi-component product on said conveyor device when said run of said conveyor device is at one of said stop positions within said production zone, (b) depositing a second portion of its associated component of said multi-component product on said conveyor device during a forward movement of said run of said conveyor device through said production zone from said stop position of said run of said conveyor device to a next stop position of said run of said conveyor device, and (c) depositing a third portion of its associated component of said multi-component product on said conveyor device when said run of said conveyor device is in said next stop position, and
   a second drive means attached to said plurality of movable discharge devices for moving each of said movable discharge devices forwardly from a corresponding first position through said production zone in register with said run of said conveyor device during every second stepwise movoement of said run of said conveyor device to a second position and returning said movable discharge devices to said first position in the direction opposite the forward movement of said run of said conveyor device during the next forward movement of said run of said conveyor device, each of said first and second positions corresponding to a stop position of said conveyor device.

2. An apparatus according to claim 1, wherein said conveyor device includes a frame and a conveyor belt mounted on said frame, said conveyor belt including a rectilinear portion which provides said run of said conveyor device.

3. An apparatus according to claim 1, wherein said first drive device comprises a moment amplifier and said second drive device comprises a linear amplifier.

4. An apparatus according to claim 3, including a first step motor operatively associated with said moment amplifier, a second step motor operatively associated with said linear amplifier and a microprocessor connected to said first and second step motors for controlling the speed of movement of said run of said conveyor device through said production zone, each time period during which said run of said conveyor device is moving forwardly through said production zone and each time period durlng which said run of said conveyor device is stopped within said production zone.

5. An apparatus according to claim 1, wherein said conveyor device defines opposite first and second sides thereof, wherein a stationary beam is positioned along said first side of said conveyor device, wherein a stationary sliding rod is positioned along said second side of said conveyor device, wherein said stationary discharge devices are mounted on said stationary beam and said stationary sliding rod, wherein said second drive means includes a movable sliding rod which extends along said first side of said conveyor device, and wherein said movable discharge devices are mounted on said movable sliding rod and said stationary sliding rod.

6. An apparatus according to claim 1, wherein said conveyor device includes a frame having opposite ends, two parallel reversing rollers mounted on the frame at its respective opposite ends, and an endless conveyor belt wrapped around said two reversing rollers, one of the portions of said endless conveyor belt extending between said two reversing rollers being rectilinear and providing said run of said conveyor device.

7. An apparatus according to claim 6, wherein said endless conveyor belt comprises a plurality of parallel metal slats that are connected together at their respective ends.

8. An apparatus according to claim 7, wherein each of said metal slats includes at least one hole therein, wherein a first of said plurality of stationary discharge devices functions to deposit a wrapping cone in each hole of a slat, wherein a first of said plurality of movable discharge devices functions to deposit an impregnating material into each wrapping cone positioned in each hole of a slat, wherein a second of said plurality of movable discharge devices functions to deposit ice cream into each impregnated wrapping cone positioned in each hole of a slat, wherein a second of said plurality of stationary discharge devices functions to deposit chocolate on top of the ice cream in each impregnated wrapping cone positioned in each hole of a slat, wherein a third of said plurality of stationary discharge devices functions to deposit a lid on top of the chocolate-topped ice cream in each impregnated wrapping cone positioned in each hole of a slat, and wherein a fourth of said stationary discharge devices function to seal each said lid against its associated impregnated wrapping cone positiond in each hole of a slat.

* * * * *

UNITED STATES PATENT AND TRADEMARK OFFICE
CERTIFICATE OF CORRECTION

PATENT NO. : 4,751,806
DATED : June 21, 1988
INVENTOR(S) : Klaus Gram

It is certified that error appears in the above-identified patent and that said Letters Patent is hereby corrected as shown below:

On the title page assignee should read

-- [73] Assignee: Brødrene Gram A/S, Vojens, Denmark --.

Signed and Sealed this

Twentieth Day of December, 1988

*Attest:*

DONALD J. QUIGG

*Attesting Officer*  *Commissioner of Patents and Trademarks*